Patented Apr. 25, 1939

2,156,095

UNITED STATES PATENT OFFICE 2,156,095

PRODUCTION OF CONDENSATION PRODUCTS FROM HYDROGEN SULPHIDE AND ACETYLENE

Walter Reppe and Fritz Nicolai, Ludwigshafen-on-the-Rhine, Germany, assignors to I. G. Farbenindustrie Aktiengesellschaft, Frankfort-on-the-Main, Germany No Drawing. Application August 1, 1935, Serial No. 34,294. In Germany August 2, 1934

7 Claims. (Cl. 260—609)

The present invention relates to the production of condensation products from hydrogen sulphide and acetylene.

It is well known to lead acetylene or gases containing acetylene together with volatile sulphur compounds or with hydrogen sulphide, if desired with the addition of oxygen, at elevated temperatures over solid catalysts, as for example especially metals of the iron group, or their oxygen containing compounds preferably admixed with hydrates, such as bauxite. By that process, there is formed a mixture of different products consisting mainly of thiophene, ethylthiophene, ethylmercaptan, and diethylsulphide.

We have now found that valuable and more uniform condensation products from hydrogen sulphide and acetylene are obtained in a very simple manner and with good yields by causing acetylene to act on hydrogen sulphide in the presence of liquid solvents, at room temperature or advantageously at elevated temperatures, say up to 250° C., and if desired with the addition of catalysts. Pure acetylene or acetylene diluted with inert gases, such as nitrogen, may be employed. As suitable solvents may be mentioned, for example, polyhydric alcohols and their ethers still containing free hydroxyl groups, such as mono-, di- and tri-ethylene glycol, propylene glycol, trimethylene glycol, 1.3-butylene glycol, glycerol, polyglycerols and diethylene glycol monoethyl ether.

Metal sulphides such as sulphides and polysulphides of the alkali metals, alkaline earth metals, ammonia and the heavy metals are eminently suitable as catalysts either when added as such or formed in situ from compounds or salts of metals and ammonia which are converted into sulphides by the action of hydrogen sulphide, as for instance the salts of copper, iron or nickel.

Depending on whether the acetylene is allowed to act under pressure on dissolved hydrogen sulphide or whether a mixture of acetylene and hydrogen sulphide is led through a solvent of high boiling point in which a catalyst is dissolved, different reaction products are obtained.

(A) For example if acetylene be allowed to act under pressure at from 60° to 100° C. on hydrogen sulphide in an aqueous solution of potassium hydrosulphide, polymerization products of thioacetaldehyde, especially the alpha-trithioaldehyde, are mainly obtained. The same product is obtained by employing dioxane instead of water.

(B) If, on the other hand, hydrogen sulphide be led in admixture with acetylene through a solvent of high boiling point in which a small amount of potassium hydrosulphide has been dissolved as a catalyst, ethyl mercaptan, vinyl ethyl sulphide or ethane dithiol diethyl ether or mixtures of these three products are obtained depending on the proportions employed.

The course of the reaction can be explained by assuming that at first the unknown vinyl mercaptan is formed from equimolecular proportions of acetylene and hydrogen sulphide. In the first case (A) this vinyl mercaptan changes into monothioacetaldehyde, with which it is isomeric. By reason of the fact that monothioacetaldehyde is very unstable and readily polymerizes, alpha-trithioacetaldehyde is mainly obtained as the reaction product.

In the second case (B) the primarily formed vinyl mercaptan is reduced by a second molecular proportion of hydrogen sulphide into ethyl mercaptan (the sulphur thus formed being partly used up for the formation of polysulphides). The ethyl mercaptan is then converted by the excess acetylene into ethyl vinyl sulphide. The latter adds on a further molecule of mercaptan with the formation of ethane dithiol diethyl ether.

The course of the reactions is shown in the following equations:

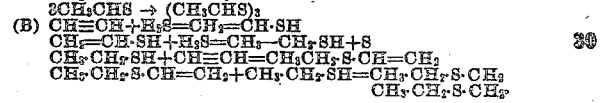

The following examples will further illustrate how our present invention may be carried out in practice but the invention is not restricted to these particular examples. The parts are by weight.

*Example A*

If acetylene be caused to act at 100° under a pressure of from 10 to 20 atmospheres on an aqueous solution of hydrogen sulphide containing 200 parts of hydrogen sulphide to 750 parts of water and in which 10 parts of potassium hydrosulphide have been dissolved, there is obtained after a reaction period of 12 hours an absorption of acetylene of 120 parts. The brown oily reaction product consists mainly of alpha-trithioaldehyde melting at 101° C.

The same product is obtained by employing dioxane as the solvent for the hydrogen sulphide instead of water. When working without the employment of potassium hydrosulphide as catalyst, alpha-trithioaldehyde is also obtained, but the absorption of acetylene is slower.

*Example B*

A mixture of equal parts by volume of hydrogen sulphide and acetylene is led at a speed of 44 litres per hour through a vertical iron tube of about 4 litres capacity containing a solution of 90 grams of potassium hydrosulphide in 3 kilograms of diethylene glycol at a temperature of from 120 to 130° C. After a reaction period of 13 hours, 154 grams of ethyl mercaptan are obtained in a receiver connected with the iron tube and cooled to 50° below zero C.

If the proportions of hydrogen sulphide and acetylene are altered under otherwise identical conditions so that 22 litres of hydrogen sulphide and 50 litres of acetylene pass through the reaction liquid, the reaction product obtained after working for 40 hours is 505 grams of ethyl mercaptan and 81 grams of vinyl ethyl sulphide having a boiling point of 91° C.

By employing a gas mixture consisting of from 85 to 90 per cent by volume of acetylene and from 15 to 10 per cent of hydrogen sulphide, a mixture is obtained consisting of about 7 per cent of ethyl mercaptan, 27 per cent of vinyl ethyl sulphide and 64 per cent of ethane dithiol diethyl ether.

What we claim is:

1. The process of producing condensation products from hydrogen sulphide and acetylene which comprises reacting acetylene with hydrogen sulphide in the presence of an aliphatic, water-soluble, liquid solvent selected from the group consisting of polyhydric alcohols and their ethers containing at least one free hydroxyl group and in the presence of a metal sulphide catalyst.

2. A process as claimed in claim 1, wherein the reaction is carried out in the presence of the therein defined solvent and a catalyst, a sulphide selected from the class consisting of alkali metal sulphides and ammonium sulphides.

3. The process of producing condensation products from hydrogen sulphide and acetylene which comprises leading a mixture of acetylene and hydrogen sulphide through an aliphatic, water-soluble, liquid solvent selected from the group consisting of polyhydric alcohols and their ethers containing at least one free hydroxyl group, in which solvent there is dissolved a catalyst comprising a metal sulphide.

4. The process of producing condensation products from hydrogen sulphide and acetylene which comprises reacting acetylene with hydrogen sulphide in the presence of a water-soluble, symmetrical hydroxy aliphatic ether and in the presence of a metal sulphide catalyst.

5. The process of producing condensation products from hydrogen sulphide and acetylene which comprises reacting acetylene with hydrogen sulphide in the presence of diethylene glycol and in the presence of a metal sulphide catalyst.

6. The process of producing condensation products from hydrogen sulphide and acetylene which comprises reacting acetylene with hydrogen sulphide in the presence of an aliphatic water soluble liquid solvent selected from the group consisting of polyhydric alcohols and their ethers containing at least one free hydroxyl group and in the presence of a catalyst comprising an alkali metal hydrosulphide.

7. The process of producing condensation products from hydrogen sulphide and acetylene which comprises reacting acetylene with hydrogen sulphide in the presence of an aliphatic water soluble liquid solvent selected from the group consisting of polyhydric alcohols and their ethers containing at least one free hydroxy group in the presence of a catalyst comprising ammonium hydrosulphide.

WALTER REPPE.
FRITZ NICOLAI.